(12) United States Patent
Hada

(10) Patent No.: US 8,203,724 B2
(45) Date of Patent: Jun. 19, 2012

(54) IMAGE FORMING APPARATUS AND CONTROL METHOD THEREFOR, AS WELL AS PROGRAM FOR IMPLEMENTING THE CONTROL METHOD

(75) Inventor: Manabu Hada, Kawasaki (JP)

(73) Assignee: Canon Kabushiki Kaisha (JP)

( * ) Notice: Subject to any disclaimer, the term of this patent is extended or adjusted under 35 U.S.C. 154(b) by 974 days.

(21) Appl. No.: 11/406,979

(22) Filed: Apr. 19, 2006

(65) Prior Publication Data

US 2006/0238794 A1 Oct. 26, 2006

(30) Foreign Application Priority Data

Apr. 20, 2005 (JP) .................................. 2005-122759

(51) Int. Cl.
- G06F 3/12 (2006.01)
- G06K 15/02 (2006.01)
- G06K 15/00 (2006.01)
- H04N 1/00 (2006.01)
- H04N 1/393 (2006.01)

(52) U.S. Cl. ...... 358/1.13; 358/1.9; 358/1.11; 358/1.15; 358/1.18; 358/501; 358/401; 358/451; 358/462; 399/43; 399/80; 399/81

(58) Field of Classification Search .................. 358/1.9, 358/1.11, 1.15, 1.13, 1.18, 501, 451, 462; 399/80, 81
See application file for complete search history.

(56) References Cited

U.S. PATENT DOCUMENTS

| | | | | |
|---|---|---|---|---|
| 4,766,467 A | * | 8/1988 | Yamada et al. ............... | 399/110 |
| 5,268,993 A | * | 12/1993 | Ikenoue et al. ............... | 358/1.15 |
| 5,396,341 A | | 3/1995 | Takahashi et al. | |
| 5,715,380 A | * | 2/1998 | Lee ............................... | 358/1.13 |
| 5,887,216 A | * | 3/1999 | Motoyama ..................... | 399/8 |
| 6,029,023 A | * | 2/2000 | Munemori et al. ............. | 399/66 |
| 6,512,592 B1 | * | 1/2003 | Simpson et al. ................ | 358/1.15 |
| 6,982,804 B2 | * | 1/2006 | Frolik et al. .................. | 358/1.15 |
| 7,046,388 B1 | * | 5/2006 | Shibata ......................... | 358/1.18 |
| 7,209,250 B2 | * | 4/2007 | Nakao .......................... | 358/1.15 |
| 2001/0024578 A1 | * | 9/2001 | Fujii et al. ..................... | 399/17 |
| 2003/0011802 A1 | * | 1/2003 | Nakagiri et al. ............... | 358/1.13 |
| 2003/0081024 A1 | * | 5/2003 | Vives et al. .................... | 347/9 |
| 2003/0093675 A1 | * | 5/2003 | Hibino et al. .................. | 713/168 |
| 2003/0103237 A1 | * | 6/2003 | Han .............................. | 358/1.18 |
| 2004/0027602 A1 | * | 2/2004 | Kuboki ......................... | 358/1.13 |
| 2004/0156056 A1 | * | 8/2004 | Sawada ......................... | 358/1.2 |
| 2004/0190062 A1 | * | 9/2004 | McIntyre ...................... | 358/1.18 |
| 2004/0252341 A1 | * | 12/2004 | Adachi et al. ................. | 358/1.18 |

(Continued)

FOREIGN PATENT DOCUMENTS

JP 6-276337 A 9/1994

(Continued)

*Primary Examiner* — King Poon
*Assistant Examiner* — Beniyam Menberu
(74) *Attorney, Agent, or Firm* — Rossi, Kimms & McDowell LLP

(57) ABSTRACT

An image forming apparatus which, when a conference material or the like is printed, is capable of printing the material according to the preferences of presentees of the conference while avoiding the conference material from being printed according to print settings by users responsible for printing the conference material. Print setting information is registered on a user-by-user basis. An image printing process is executed based on the registered print setting information. When the image printing process is executed based on the registered print setting information, a user-identifying image corresponding to the print setting information is added to the image to be printed.

9 Claims, 12 Drawing Sheets

U.S. PATENT DOCUMENTS

| | | | |
|---|---|---|---|
| 2005/0248800 A1* | 11/2005 | Choi | 358/1.13 |
| 2006/0023243 A1* | 2/2006 | Asai | 358/1.13 |
| 2006/0092453 A1* | 5/2006 | Okada et al. | 358/1.14 |
| 2008/0131181 A1* | 6/2008 | Saitoh et al. | 400/76 |
| 2008/0231880 A1* | 9/2008 | Ming | 358/1.15 |

FOREIGN PATENT DOCUMENTS

| | | | |
|---|---|---|---|
| JP | 2000-263873 A | | 9/2000 |
| JP | 2001-191605 A | | 7/2001 |
| JP | 2001-320575 A | | 11/2001 |
| JP | 2002-337416 A | | 11/2002 |
| JP | 2002-374400 A | | 12/2002 |
| JP | 2004-058500 | * | 2/2004 |
| JP | 2004-058500 A | | 2/2004 |
| JP | 2004-312534 A | | 11/2004 |
| JP | 2004-362005 A | | 12/2004 |

* cited by examiner

IMAGE FORMING APPARATUS AND CONTROL METHOD THEREFOR, AS WELL AS PROGRAM FOR IMPLEMENTING THE CONTROL METHOD

BACKGROUND OF THE INVENTION

1. Field of the Invention

The present invention relates to an image forming apparatus and a control method therefor, as well as a program for implementing the control method, and more particularly to an image forming apparatus that performs printout according to the preferences of a user and a control method therefor, as well as a program for implementing the control method.

2. Description of the Related Art

In recent years, there have come into use multifunction printers (hereinafter referred to as "the MFPs") which are formed by adding a printer function, a FAX transmission/reception function, a scanned image transmission/reception function, and an e-mail transmission/reception function to a copying machine having a copying function. This makes it possible to enhance efficiency of users' office work and attain space saving.

Manufacturers developing MFPs have been making the MFP even more multifunctional to thereby further enhance the users' work efficiency. Recently, the manufacturers are studying the personalization and customization of an MFP, and the linking of the operation of the same with a scheduler application for a personal computer (hereinafter referred to as "the PC")

The following is an example of the prior art of the MFP of the above-mentioned kind. The MFP is provided with a destination management table that associates destinations to which a copy of an original is to be distributed, with identification codes, respectively, and defines output means corresponding to the destinations, and a group number management table that stores group numbers each designating a plurality of arbitrarily selected destinations, and identification codes associated with the destinations belonging to the number. When a group number is input to the MFP, the MFP determines destinations designated by the group number. Then, by looking up the destination management table, the MFP delivers image information of an original, read by a scanner, to the destinations, using respective associated output means (see e.g. Japanese Laid-Open Patent Publication (Kokai) No. H06-276337).

Further, there have been proposed techniques of enhancing operability of users, such as a technique "for an apparatus that forms a back by detecting a header and a footer e.g. during case binding, in which a font size is changed depending on the amount of characters in the header and the footer" and a technique "for a dot impact printer in which when data using an unprintable font size has been input, the font size is changed to a printable font size" (see e.g. Japanese Laid-Open Patent Publication (Kokai) No. 2001-320575).

In the above conventional MFP, however, e.g. when a conference material is printed, there is a possibility of execution of various type of printing, such as "N in 1" printing (printing of N pages of an original on one side of each sheet), double-sided printing, or a combination of these, depending on the preferences of a person responsible for printing the conference material. As a result, if persons having difficulty in reading small characters or the like are among the presentees of the conference material or presentees of the conference, they sometimes find distributed conference material difficult to read.

Further, some presentees of the conference may request reprinting of the conference material after the conference is closed, due to their preferences of particular print settings. This requires the material to be printed a plurality of times.

SUMMARY OF THE INVENTION

It is a first object of the present invention to provide an image forming apparatus which is capable of printing a conference material or the like, according to the preferences of presentees of the conference or other persons while avoiding the material from being printed according to print settings by users responsible for printing the material, and a control method therefor, as well as a program for implementing the control method.

It is a second object of the present invention to provide an image forming apparatus which is capable of printing a material such that the material is easily readable even by persons having weak eyesight, and a control method therefor, as well as a program for implementing the control method.

To attain the above objects, in a first aspect of the present invention, there is provided an image forming apparatus that prints an image based on print setting information, comprising a registration unit adapted to register print setting information on a user-by-user basis, a printing unit adapted to execute an image printing process based on the registered print setting information, and an addition unit adapted to add a user-identifying image corresponding to the print setting information to the image to be printed, when the printing unit executes the image printing process based on the registered print setting information.

With the arrangement of the first aspect of the present invention, for example, in printing a conference material or the like, it is possible to print the material according to the preferences of presentees of the conference or other persons while avoiding the material from being printed according to print settings different between different persons responsible for printing the conference material. Further, it is possible to print a conference material such that the conference material is easily readable even by persons having weak eyesight. Moreover, when copies of the conference material are distributed to presentees of the conference, it is easy to know which copy should be distributed to which presentee of the conference.

Preferably, the registration unit registers a user ID for identifying the user and the print setting information of the user in a manner associated with each other.

Preferably, the addition unit adds a character string indicative of the user ID to the image to be printed based on the print setting information, as the user-identifying image.

To attain the above objects, in a second aspect of the present invention, there is provided an image forming apparatus that prints an image, comprising a print-instructing unit adapted to give an instruction to print an image to be printed, a registration unit adapted to register print setting information, for each piece of user-identifying information for use in identification of a user, a printing unit adapted to execute an image printing process based on the registered print setting information, a designation unit adapted to designate the user-identifying information, wherein when the print-instructing unit gives an instruction to print, if at least one piece of the user-identifying information has been designated by the designation unit, the printing unit executes the image printing process based on the print setting information corresponding to the designated user-identifying information, and on the other hand, if no print setting information corresponding to the designated user-identifying information has been registered, the printing unit executes the image printing process based on predetermined print setting information.

With the arrangement of the second aspect of the present invention, for example, when a conference material or the like is printed, it is possible to print the material according to the preferences of presentees of the conference while avoiding the conference material from being printed according to different print settings by different persons responsible for printing the conference material. Further, even when various types of printings are carried out according to various preferences, it is only required to provide a single print instruction.

Preferably, the image forming apparatus comprises an addition unit adapted to add a user-identifying image corresponding to the registered print setting information to the image to be printed, when the image printing process is performed based on the registered print setting information.

Preferably, the print-instructing unit further comprises an input unit adapted to input print setting information, and if no user-identifying information is designated by the designation unit, the printing unit executes the image printing process based on the print setting information input by the input unit.

To attain the above objects, in a third aspect of the present invention, there is provided a control method of controlling an image forming apparatus that prints an image based on print setting information, comprising a registration step of registering print setting information in the image forming apparatus on a user-by-user basis, a printing step of executes an image printing process based on the registered print setting information, and an addition step of adding a user-identifying image corresponding to the print setting information to the image to be printed, when the image printing process is executed based on the registered print setting information in the printing step.

To attain the above objects, in a fourth aspect of the present invention, there is provided a method of controlling an image forming apparatus a control method of controlling an image forming apparatus that prints an image, comprising a print-instructing step of giving an instruction to print an image to be printed, a registration step of registering print setting information in the image forming apparatus, for each piece of user-identifying information for use in identification of a user, a printing step of executing an image printing process based on the registered print setting information, a designation step of designating the user-identifying information, wherein when an instruction is given to print in the print-instructing step, if at least one piece of the user-identifying information has been designated in the designation step, in the printing step, the image printing process is executed based on the print setting information corresponding to the designated user-identifying information, and on the other hand, if no print setting information corresponding to the designated user-identifying information has been registered, the image printing process is executed based on predetermined print setting information.

To attain the above objects, in a fifth aspect of the present invention, there is provided a control program for causing a computer to execute a control method of controlling an image forming apparatus for printing an image based on print setting information, comprising a registration module for registering print setting information in the image forming apparatus on a user-by-user basis, a printing module for executes an image printing process based on the registered print setting information, and an addition module for adding a user-identifying image corresponding to the print setting information to the image to be printed, when the printing module executes the image printing process based on the registered print setting information.

To attain the above objects, in a sixth aspect of the present invention, there is provided a control program for causing a computer to execute a control method of controlling an image forming apparatus for printing an image, comprising a print-instructing module for giving an instruction to print an image to be printed, a registration module for registering print setting information in the image forming apparatus, for each piece of user-identifying information for use in identification of a user, a printing module for executing an image printing process based on the registered print setting information, a designation module for designating the user-identifying information, wherein when the print-instructing module gives an instruction to print, if at least one piece of the user-identifying information has been designated by the designation module, the printing module executes the image printing process based on the print setting information corresponding to the designated user-identifying information, and on the other hand, if no print setting information corresponding to the designated user-identifying information has been registered, the printing module executes the image printing process based on predetermined print setting information.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to drawings showing embodiments thereof.

Figure 1:
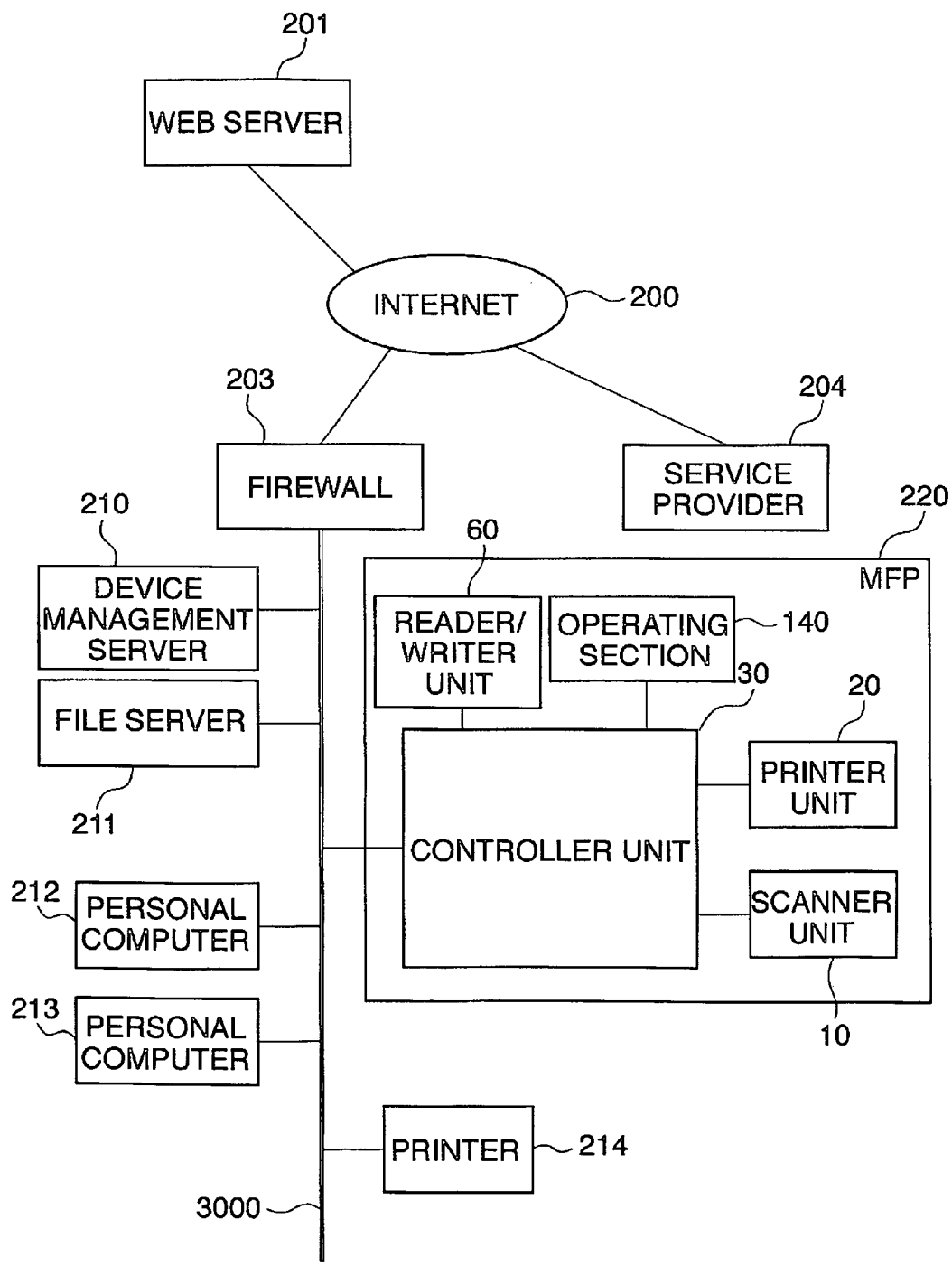
FIG. 1 is a block diagram showing the entire arrangement of a network system including an image forming apparatus according to a first embodiment of the present invention.

FIG. 1 is a block diagram showing the entire arrangement of a network system including an image forming apparatus according to a first embodiment of the present invention.

In FIG. 1, the Internet 200 is an internet communication network. A web server 201 is connected to the Internet 200, and provides specific services to Internet users. A service provider 204 performs processes for connecting between terminal units e.g. of personal computers owned or used by the users, and the Internet 200. A firewall 203 connects between a LAN 3000 and external communication networks, such as the Internet 200, for performing security management and so forth.

A device management server 210 manages terminal units connected to the LAN 3000. A file server 211 manages and stores files and data which can be shared by a plurality of users on the LAN 3000. Personal computers 212 and 213 are terminal units for the users, which are connected to the LAN 3000. A printer 214 is capable of printing image data from the personal computers 212 and 213 and the file server 211, on sheets.

An MFP (Multi-Function Printer) 220 is an image forming apparatus formed by adding a printer function, a FAX transmission/reception function, a scanned image transmission/reception function, and an e-mail transmission/reception function to a digital copying machine having a copying function. Further, the MFP 220 has an image input/output function.

The personal computers 212 and 213 are each capable of viewing information provided from the web server 201 via the Internet 200, and outputting image data to the MFP 220 and the printer 214.

The MFP 220 is comprised of an operating section 140 via which the user performs various kinds of operations, a scanner unit 10 that reads images e.g. from originals in response to instructions from the operating section 140 and the personal computers 212 and 213, a printer unit 20 that prints image data from the personal computers 212 and 213 and the file server 211 on sheets, a controller unit 30, and a reader/writer unit 60 capable of transmitting and receiving data between the same and a radio tag (not shown).

The controller unit 30 controls the whole MFP 220. Further, the controller unit 30 controls input/output of image data to and from the scanner unit 10 and the printer unit 20 in response to instructions from the operating section 140 and the personal computers 212 and 213. For example, the controller unit 30 accumulates data of an image scanned by the scanner unit 10 in a memory (not shown) integrated therein, and outputs the image data to the personal computers 212 and 213. Further, the controller unit 30 causes the printer unit 20 to print the image data.

Although in the above-described configuration, the LAN 3000 is connected to the Internet 200 via the firewall 203, the firewall 203 may be configured such that it is connected to the Internet 200 via the service provider 204.

Figure 2:
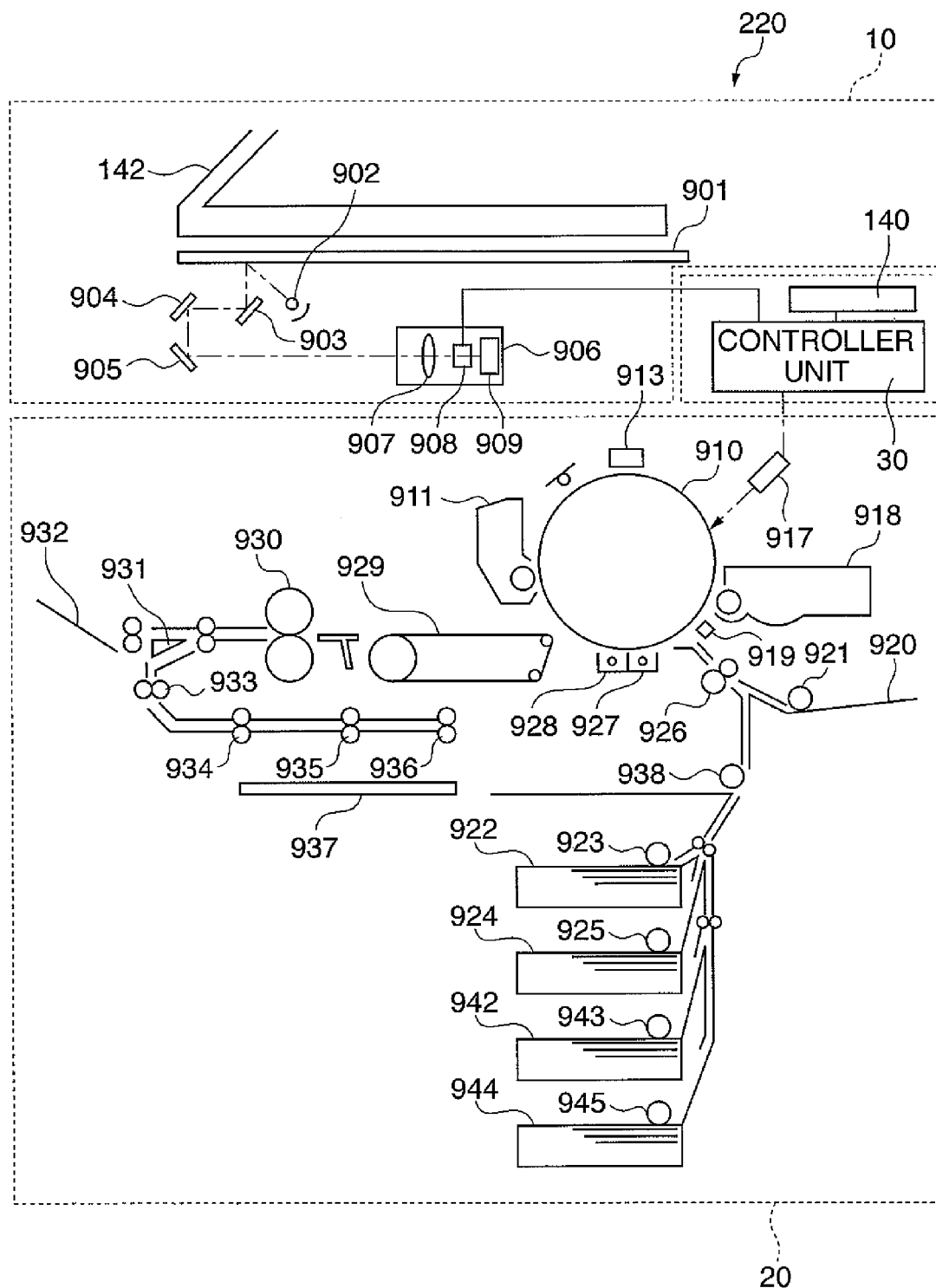
FIG. 2 is a schematic longitudinal cross-sectional view showing the internal arrangement of an MFP appearing in FIG. 1.

FIG. 2 is a schematic longitudinal cross-sectional view showing the internal arrangement of the MFP 220 appearing in FIG. 1.

As shown in FIG. 2, originals fed from an automatic original feeder 142 are sequentially placed in a predetermined position on an original platen glass 901. An original illuminating lamp 902 is implemented e.g. by a halogen lamp, for irradiating an original placed on the original platen glass 901. Scanning mirrors 903, 904, and 905 are accommodated in an optical scanning unit, not shown, for making reciprocating motions to guide reflected light from the original on the original platen glass 901 to a CCD unit 906.

The CCD unit 906 is mainly comprised of an image pickup element 908 implemented e.g. by CCDs (Charge Coupled Devices), a focusing lens 907 for focusing the reflected light from the original on the CCDs, and a CCD driver 909 for driving the image pickup element 908. An image signal output from the image pickup element 908 is converted into digital data e.g. of 8 bits, and then input to the controller unit 30.

A photosensitive drum 910 is destaticized by a pre-exposure lamp to prepare for image formation. A primary electrostatic charger 913 uniformly electrifies the photosensitive drum 910. An exposure unit 917 is formed e.g. by a semiconductor laser. The exposure unit 917 irradiates the photosensitive drum 910 based on the image data processed by the controller unit 30 to form a static latent image thereon. A developing device 918 contains a black developer (toner). A pre-transfer electrostatic charger 919 applies high voltage to the photosensitive drum 910 before a toner image developed on the photosensitive drum 910 is transferred to a sheet.

Sheet feed rollers 921, 923, 925, 943, and 945 associated with a manual feed unit 920 and sheet feed units 922, 924, 942, and 944 are driven to feed sheets from the respective associated feed units into the MFP. A sheet fed from each sheet feed unit is temporarily stopped at a location of a registration roller 926, and then writing timing and sheet feed timing in transferring a toner image developed on the photosensitive drum 910 to a sheet are adjusted. Thereafter, feeding of the sheet is resumed. A transfer electrostatic charger 927 transfers a toner image formed on the photosensitive drum 910 to the sheet fed thereto. A separating electrostatic charger 928 separates the sheet on which a transfer operation has been completed, from the photosensitive drum 910. The toner remaining on the photosensitive drum 910 without being transferred to the sheet is collected by a cleaner 911.

A conveyor belt 929 conveys the sheet on which the transfer process has been completed to a fixing unit 930, where the toner image is fixed to the sheet e.g. by heat. A flapper 931 switches the conveying direction of the sheet, for which the transfer process has been completed, between a direction toward a sorter 932 and a direction toward an intermediate tray 937. Feed rollers 933, 934, 935, and 936 feed the sheet, for which the fixing process has once been completed, after inverting the same (for multiple printing) or without inverting the same (for double-sided printing). A re-feed roller 938 again feeds the sheet placed on the intermediate tray 937 up to a location where the registration roller 926 is disposed.

The controller unit 30 includes a CPU (Central Processing Unit), referred to hereinafter, an image processing section, and so forth, and causes the operation of an image forming process according to instructions from the operating section 140.

Figure 3:
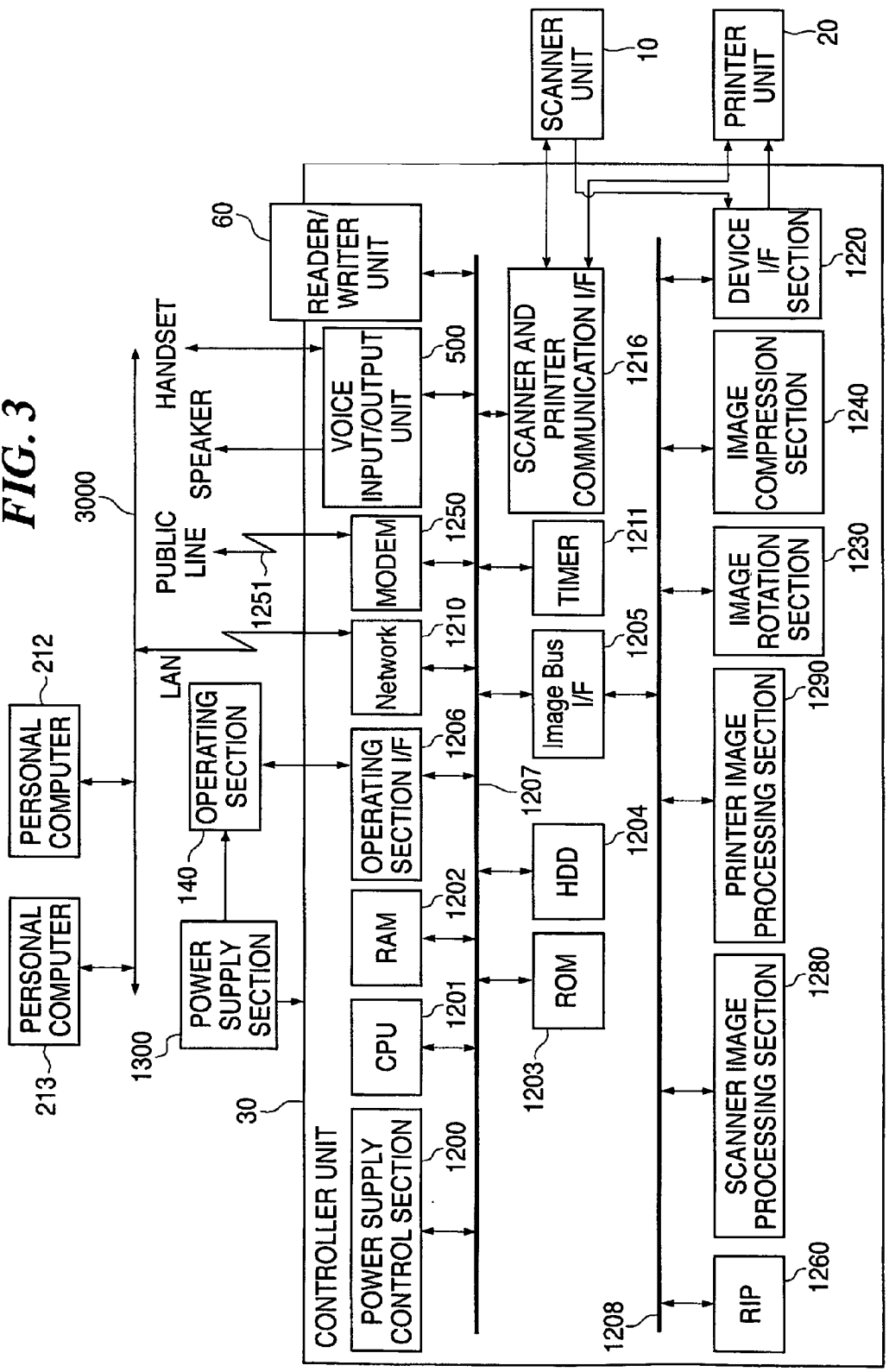
FIG. 3 is a block diagram showing the internal arrangement of a controller unit appearing in FIG. 2.

FIG. 3 is a block diagram showing the internal arrangement of the controller unit 30 appearing in FIG. 2.

In FIG. 3, the controller unit 30 is connected to the scanner unit 10 as the image input device, and the printer unit 20 as the image output device, and is further connected to a LAN 3000 and a public line (WAN) 1251, for controlling the input and output of image information and device information.

A CPU 1201 controls the overall system of the MFP. A RAM 1202 is a system work memory used for the CPU 1201 to operate, and also serves as an image memory for temporarily storing image data. A ROM 1203 is a boot ROM that stores a boot program of the system.

An HDD 1204 is a hard disk drive that stores system software, image data, and software counter values, and so forth. To store the software counter values, there are set sheet size-specific counter regions and processed data volume-specific counter regions. Each software counter value is calculated based on the volume of data processed by the CPU 1201, with reference to an arbitrary reference value set in advance, for counting up. It should be noted that the software counter value is not limitatively stored in the HDD 1204, but may be stored in an EEPROM or the like device, not shown, insofar as it is capable of storing or holding the data even after power-off.

The HDD 1204 or the ROM 1203 stores an HTTP (Hypertext Transfer Protocol) server program. The CPU 1201 starts the HTTP (Web) server program whereby the controller unit 30 is enabled to operate as the HTTP server. As a consequence, the personal computers 212 and 213 become capable of gaining access to the MFP 220. It should be noted that Web contents (e.g. an operation configuration screen of the MFP 220) offered by the HTTP server program are stored in the HDD 1204.

An operating section I/F 1206 is connected to the operating section 140 for providing interface therewith, and outputs image data to be displayed on the operating section 140 to the same. The operating section I/F 1206 informs the CPU 1201 of information that the user has input to the operating section 140. A network I/F 1210 is connected to the LAN 3000 to receive and transmit electronic mails and input and output PDL data from the personal computer 213 and the like. A modem 1250 is connected to the public line 1251 to input and output information.

A voice input/output unit 500 causes a voice signal to be output to a speaker, and controls the input and output of a voice signal to a handset. A scanner and printer communication I/F 1216 provides an interface for communication with respective CPUs (not shown) of the scanner unit 10 and the printer unit 20. A reader/writer section 60 receives data of the radio tag and transmits the received data to the CPU 1201 via a system bus 1207. An image bus I/F 1205 is a bus bridge that connects between the system bus 1207 and an image bus 1208, and converts the data structure.

The image bus 1208 is implemented by a PCI bus or an IEEE 1394 bus, and transfers image data at high speed. Connected to the image bus 2008 are devices described hereinafter. A raster image processor (RIP) 1260 expands a PDL code into a bitmap image. Further, the raster image processor 1260 determines the font size of a text portion of the PDL code. A device I/F section 1220 connects the scanner unit 10 and the printer unit 20 to the controller unit 30 to carry out synchronous system/asynchronous system conversion of image data.

A scanner image processing section 1280 corrects, processes, and edits input image data. Further, the scanner image processing section 1280 carries out optical character recognition (OCR) on the input image data to thereby also determine the font size of a text portion of the input image data. A printer image processing section 1290 performs correction, resolution conversion, and so forth, on image data for printout. An image rotation section 1230 rotates image data. An image compression section 1240 performs JPEG-based compression and expansion of multivalued image data, and JBIG-, MMR-, or MH-based compression and expansion of binary image data.

A timer 1211 is a real-time clock module for counting time, and has the function of generating an interrupt at a specified time. Further, the timer 1211 is used for setting a time for FAX transmission, sleep mode, or the like. A power supply section 1300 is a power supply unit that converts power supplied from an AC line to DC power. A power supply control section 1200 controls supply of power to the controller unit 30, the scanner unit 10, and the printer unit 20. The power supply control section 1200 controls the power supply section 1300, to thereby control the supply of power to the above-mentioned sections and units.

In the present embodiment, the user, who is a presentee of a conference material or a presentee of a conference, registers in advance print-setting information (preference settings) together with a user ID as user information, in the MFP 220. When a conference organizer or a person responsible for distribution of the conference material inputs print settings of the material, the number of copies of the material, and user ID(s) for printing (copying) the conference material by the MFP 220, printing is performed based on the registered user information.

Figure 4:
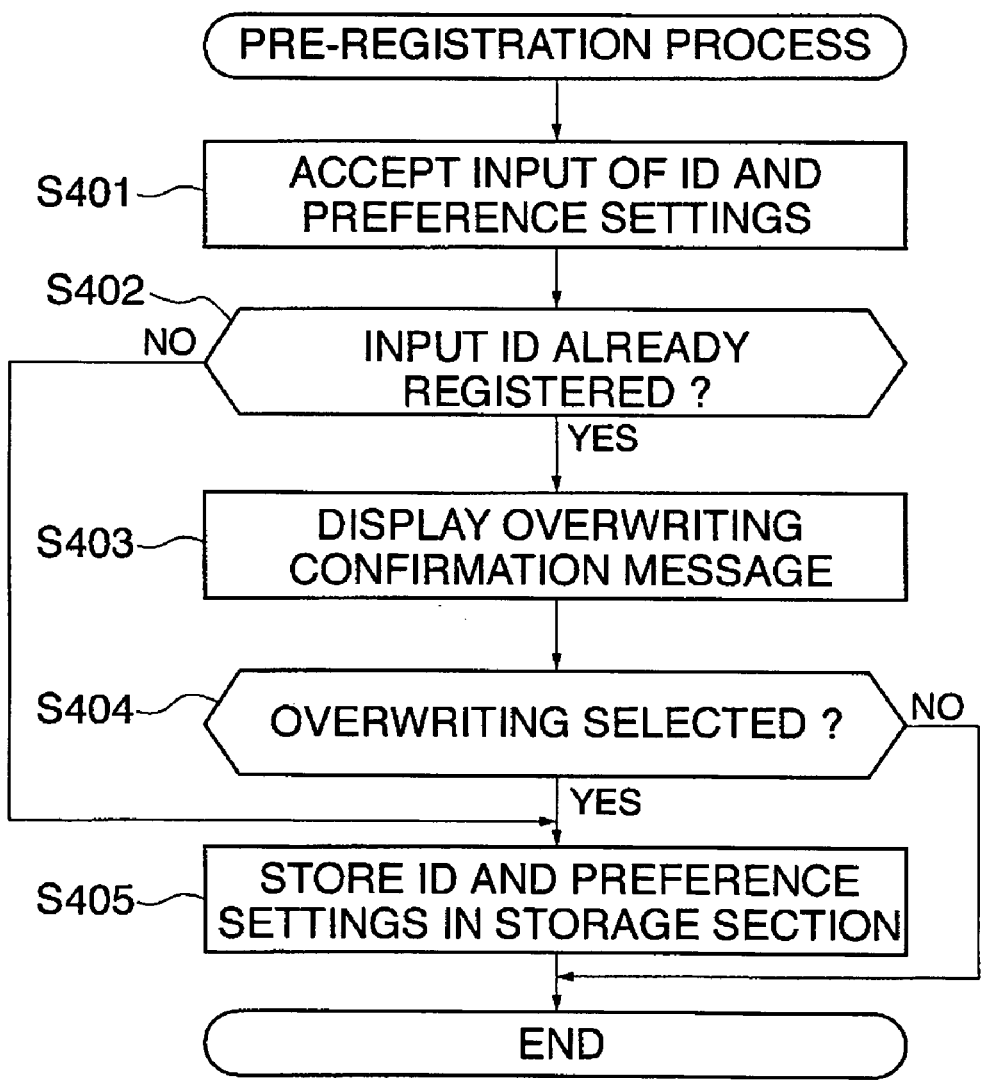
FIG. 4 is a flowchart showing a pre-registration process for registering user information in the MFP.

FIG. 4 is a flowchart showing a pre-registration process for registering the user information in the MFP 220. The present process is executed by the CPU 1201 of the controller unit 30.

As shown in FIG. 4, from a user who is a presentee of the conference material or a presentee of the conference, the MFP 220 accepts input of the user ID of the user and his/her preference settings as user information via the operating section 140 (step S401). The MFP 220 may accept input of the user information using a remote UI (user interface) function of an application installed on the personal computer 212 or the like.

In the present embodiment, the user ID is a unique number, such as a name code and an employee number, which is given to an individual user. It is assumed here, by way of example, that A123 has been input as the user ID. The preference settings are print settings the user prefers. It is assumed here, by way of example, that "2 in 1" printing and double-sided printing have been input as the preference settings.

The user information input in the step S401 is stored in a storage section, such as the HDD 1204, of the controller unit 30.

Next, in a step S402, the storage section is searched using the user ID input in the step S401, and it is determined whether or not the user ID has already been registered. If the user ID has not yet been registered, the process proceeds to a step S405. On the other hand, if the user ID has already been registered, a message asking the user to confirm whether the existing user ID may be overwritten is displayed on the operating section 140 or on the UI of the personal computer 212 or the like (step S403). For example, there is displayed a message "The user ID has already been registered. Do you wish to overwrite?".

Next, in a step S404, it is determined whether or not the user selects to overwrite in response to the displayed message. If the answer to this question is negative (NO), i.e. if "not to overwrite" is selected, the process is immediately terminated without changing the user information previously registered, whereas if the answer to the question of the step S404 is affirmative (YES), i.e. if to overwrite is selected, the process proceeds to a step S405.

In the step S405, the input user ID and preference settings are stored (overwritten) in the storage section, followed by terminating the present process.

If there exist other users to be registered, user IDs of the respective users and their preference settings are similarly registered in the MFP 220.

Next, a description will be given of a printing process carried out when the conference organizer causes the MFP 220 to print out a number of copies of the conference material corresponding to the number of presentees.

Figure 5:
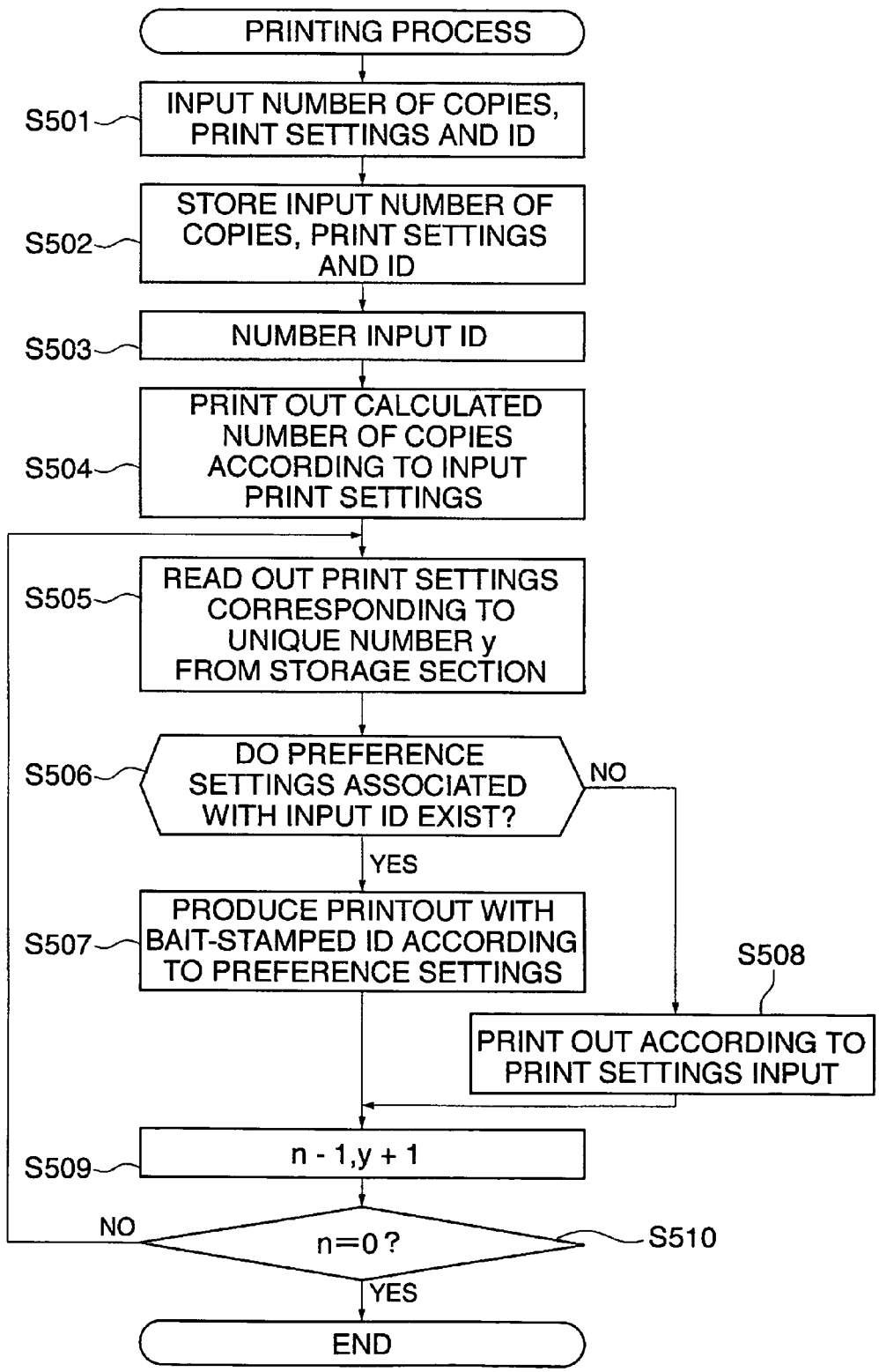
FIG. 5 is a flowchart showing a printing process executed by the MFP.

FIG. 5 is a flowchart showing the printing process performed by the MFP 220. This process is executed by the CPU 1201 of the controller unit 30.

As shown in FIG. 5, the conference organizer operates the MFP 220 using the operating section 140. Specifically, the conference organizer edits configuration items displayed on the operating section 140 to thereby input the total number of copies of the conference material to be printed, the desired print settings ("N in 1", one-sided/double-sided printing, etc.), and all or desired user IDs of persons to whom the copies of the conference material are to be distributed (step S501).

The conference organizer may access the MFP 220 using the Web browsers of the personal computer 212 or the like, and edit configuration items displayed on the Web browsers, to thereby input the above-mentioned total number of copies of the conference material, the user IDs, and so forth.

In the present embodiment, it is assumed, by way of example, that there are inputs the total number of copies: 10, desired print settings: "4 in 1" and double-sided, desired user IDs: A123, A456, and A789. These three user IDs represent users having their own preference settings. In this way, as for the user ID input in the step S501, only the user IDs that specify users having preference settings may be input, out of the user IDs of all the persons to whom the conference material is to be distributed. Alternatively, there may be input the user IDs of part or all the persons to whom the conference material is to be distributed irrespective of whether the user IDs specify users having preference settings. Further, when no desired print settings are input in the step S501, the printing is set based on default print settings (equimagnification (=100% magnification), one-sided, etc.) for the MFP 220.

The information input in the step S501 is temporarily stored in the RAM 1202 of the controller unit 30 (step S502).

Then, when a start button (not shown) on the operating section 140 or the remote UI is pressed, the CPU 1201 performs numbering to assign unique numbers y to all the user IDs temporarily stored in the RAM 1202. Then, the CPU 1201 calculates the total number n of the user IDs input by the conference organizer, and temporarily stores data obtained by the calculation in the RAM 1202 (step S503). In the present embodiment, the total number n of the user IDs is equal to 3, and the unique numbers y (y=1, 2, and 3) are assigned respectively to the user IDs of A123, A456, and A789.

Figure 6:
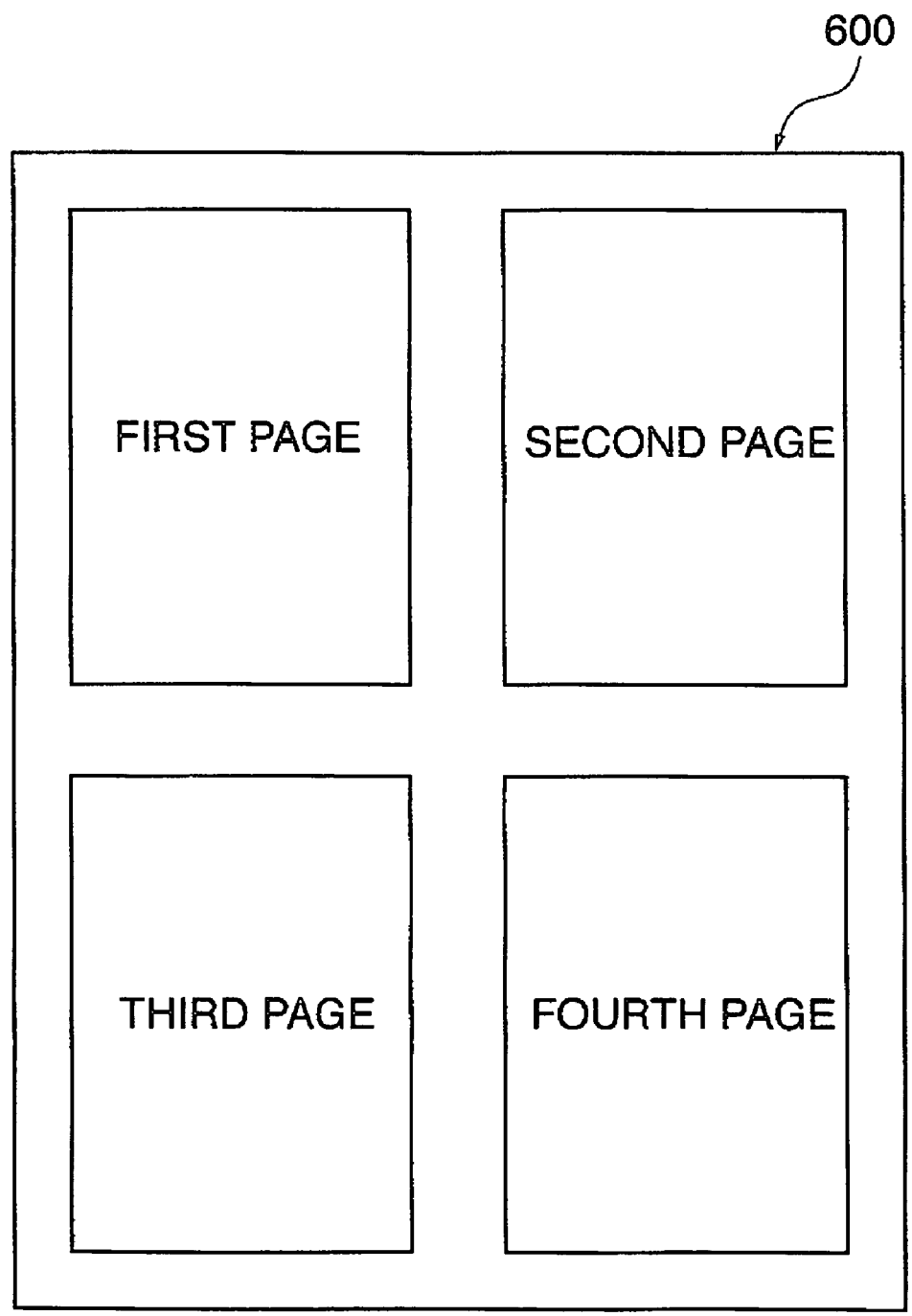
FIG. 6 is a diagram showing an example of a result of printout executed in steps S504 and S508 in FIG. 5.

Then, the CPU 1201 reads out the total number of copies of the conference material to be printed and the total number n of the user IDs, the information of which is temporarily stored in the RAM 1202, and calculates the number of copies of the conference material to be printed according to the print settings ("4 in 1" and double-sided) input in the step S501 by subtracting the total number n of the user IDs from the total number of copies to be printed. Based on the print settings input in the step S501, the CPU 1201 executes an image forming process to print out the conference material (step S504). Here, since the total number of copies (=10), and the total number n of IDs (=3) are set, the number of copies of the conference material to be printed in the step S504 is equal to 10–3=7. Thus, 7 copies of a printout result 600 shown in FIG. 6 are printed out.

Then, user information corresponding to the unique number y is read out from the user information registered through the pre-registration process in FIG. 4 (step S505). The initial value of the unique number y is equal to 1, and the user information relating to the corresponding user ID(y)=ID(1) or the user ID of A123 is first read out in the present example. The CPU 1201 determines whether or not the user information read out includes preference settings (step S506). If the answer to this question is negative (NO), i.e. if the user information does not include preference settings, an image forming process is executed according to the desired print settings ("4 in 1" and double-sided) input in the step S501, or default print settings (100% magnification and one-sided), whereby one copy of the printout result 600 in FIG. 6 is obtained (step S508).

Figure 7:
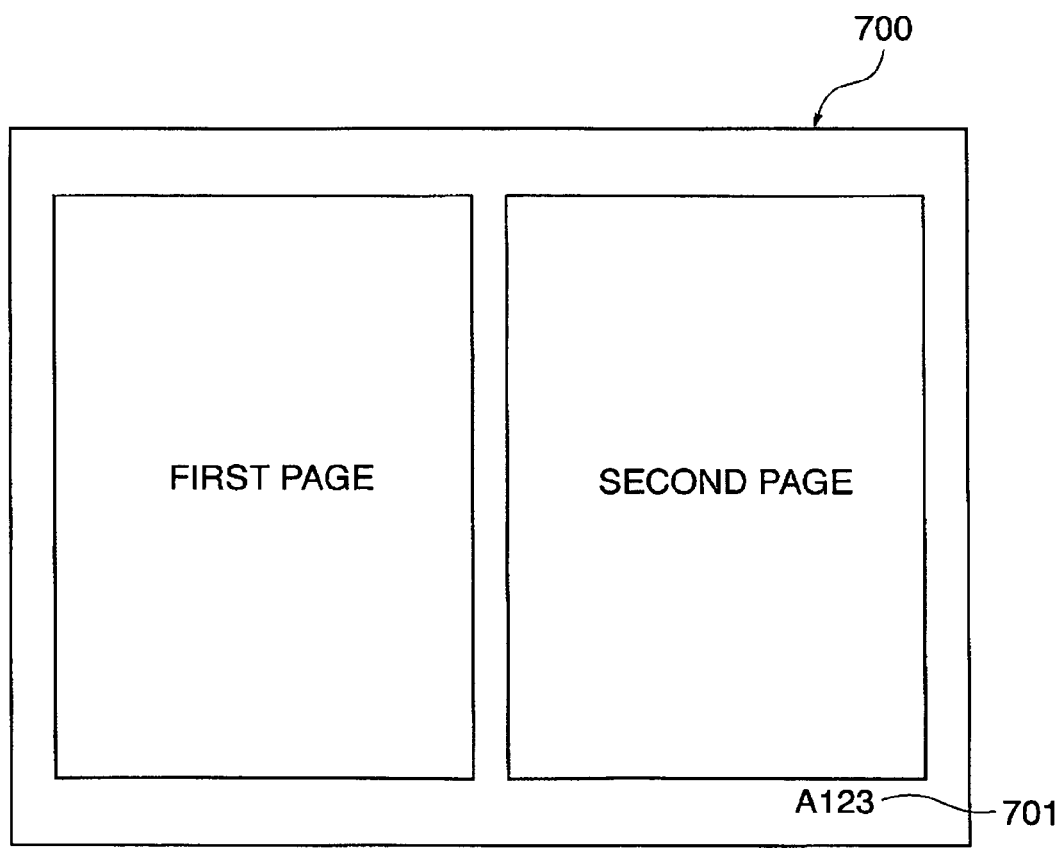
FIG. 7 is a diagram showing an example of a result of printout executed in a step S507 in FIG. 5.

On the other hand, if the answer to the question of the step S506 is affirmative (YES), i.e. if the user information includes preference settings, an image forming process is executed based on the preference settings (for example, "2 in 1" and double-sided print), the user ID(y) is stamped to show that the printing is performed according to the preference settings of the user identified by the user ID(y), and one copy of the print image is printed out, thereby obtaining a printout result 700 as shown by way of example in FIG. 7 (step S507). In the printout result 700, an ID number 701 is bate-stamped i.e. an image of a character string formed based on the user ID(y) (A123 of ID(1) in the illustrated example) and an original print image are synthesized with each other, at a lower right portion of the printout result 700.

Then, a value of 1 is subtracted from the total number n of the user IDs, and 1 is added to the unique number y assigned to the numbered ID(y) (step S509), whereafter it is determined whether or not n=0 holds (step S510). If the answer to this question is negative (NO) i.e. if n>0 holds, the process returns to the step S505 so as to read out another numbered user ID(y) (ID(2) in this case), whereas if the answer to the question is affirmative (YES), i.e. if n=0 holds, the present process is terminated.

The execution of the above process makes it possible to obtain a printout tailored to each user as a presentee of the conference material or presentee of the conference.

According to the first embodiment described above, at least one user ID and preference settings (for example, "N in 1", one-sided/double-sided, etc.) associated therewith are registered in advance in the storage section via the operating section 140 of the MFP 220 or the personal computer 212 or the like. The preference settings are read out from the storage section according to the user ID input from the operating section 140 together with the number of copies of a conference material to be printed and print settings. Then, printing is carried out based on the preference settings, and at the same time the user ID for identifying the user making the preference settings is bate-stamped to form the printed matter. As a result, it is possible to print the conference material according to preferences e.g. of presentees of the conference without according to print settings made by persons responsible for the printing of the conference material. This makes it possible to print the conference material such that it can be easily read even by persons having weak eyesight. Further, such material can be provided to the required person with ease.

A second embodiment of the present invention will be explained below, which has the same configuration (see FIGS. 1 to 3) as that of the first embodiment, and hence detailed description thereof is omitted.

Figure 8:
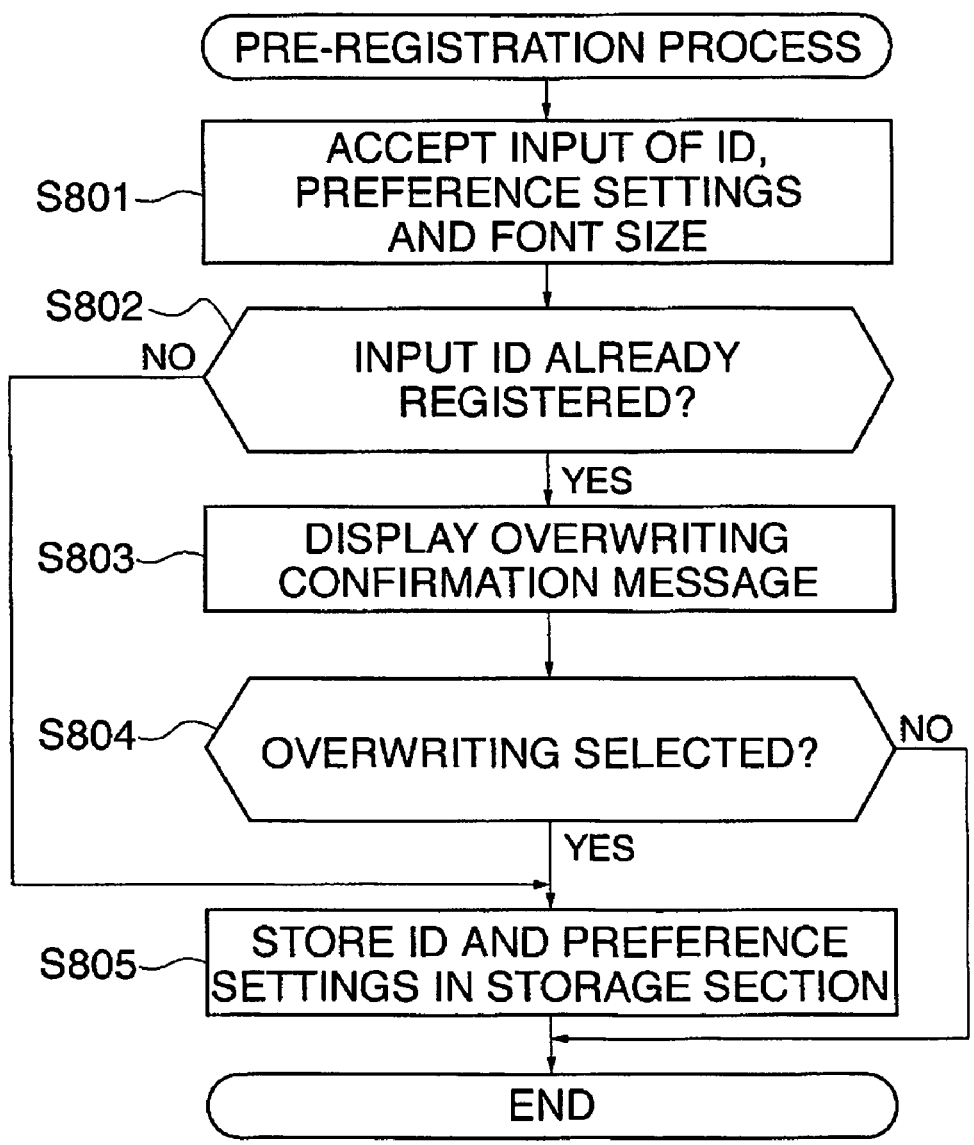
FIG. 8 is a flowchart showing a pre-registration process for registering user information in an MFP as an image forming apparatus according to a second embodiment of the present invention.

FIG. 8 is a flowchart showing a pre-registration process for registering user information in the MFP 220 according to the second embodiment of the present invention. The present process is executed by the CPU 1201 of the controller unit 30.

As shown in FIG. 8, from a user who is a presentee of the conference material or a presentee of the conference, the MFP 220 accepts input of the user ID of the user and his/her preference settings as user information via the operating section 140 (step S801). The MFP 220 may accept input of the user information using a remote UI function of an application installed on the personal computer 212 or the like.

In preference settings, it is possible to designate a font size and priority for the designated font size. In designating a font size, the user can designate the smallest font size below which any text is difficult to read with the user's eyesight, etc. In the present embodiment, it is assumed that there are inputs the user ID: A123, preference settings: "2 in 1" and double-sided print, a font size: 8 point, and priority: the font size has priority over the other related settings. The input user information is stored in a storage section, such as the HDD 1204 of the controller unit 30.

Next, in a step S802, the storage section is searched using the user ID input in the step S801, and it is determined whether or not the user ID has already been registered. If the user ID has not yet been registered, the process proceeds to a step S805. On the other hand, if the user ID has already been registered, a message asking the user to confirm whether the existing user ID may be overwritten is displayed on the operating section 140 or on the UI of the personal computer 212 or the like (step S803). For example, there is displayed a message "The user ID has already been registered. Do you wish to overwrite?".

Next, in a step S804, it is determined whether or not the user selects to overwrite in response to the displayed message. If the answer to this question is negative (NO), i.e. if "not to overwrite" is selected, the process is immediately terminated without changing the user information previously registered, whereas if the answer to the question of the step S804 is affirmative (YES), i.e. if to overwrite is selected, the process proceeds to a step S805.

In the step S805, the input user ID, preference settings, font size, and priorities for the designated font size are stored (overwritten) in the storage section, followed by terminating the present process.

If there exist other users to be registered, user IDs of the respective users, their preference settings, the font sizes, and the priorities are similarly, registered in the MFP 220.

Next, a description will be given of a printing process carried out when the conference organizer causes the MFP 220 to print out a number of copies of the conference material corresponding to the number of presentees.

Figure 9:
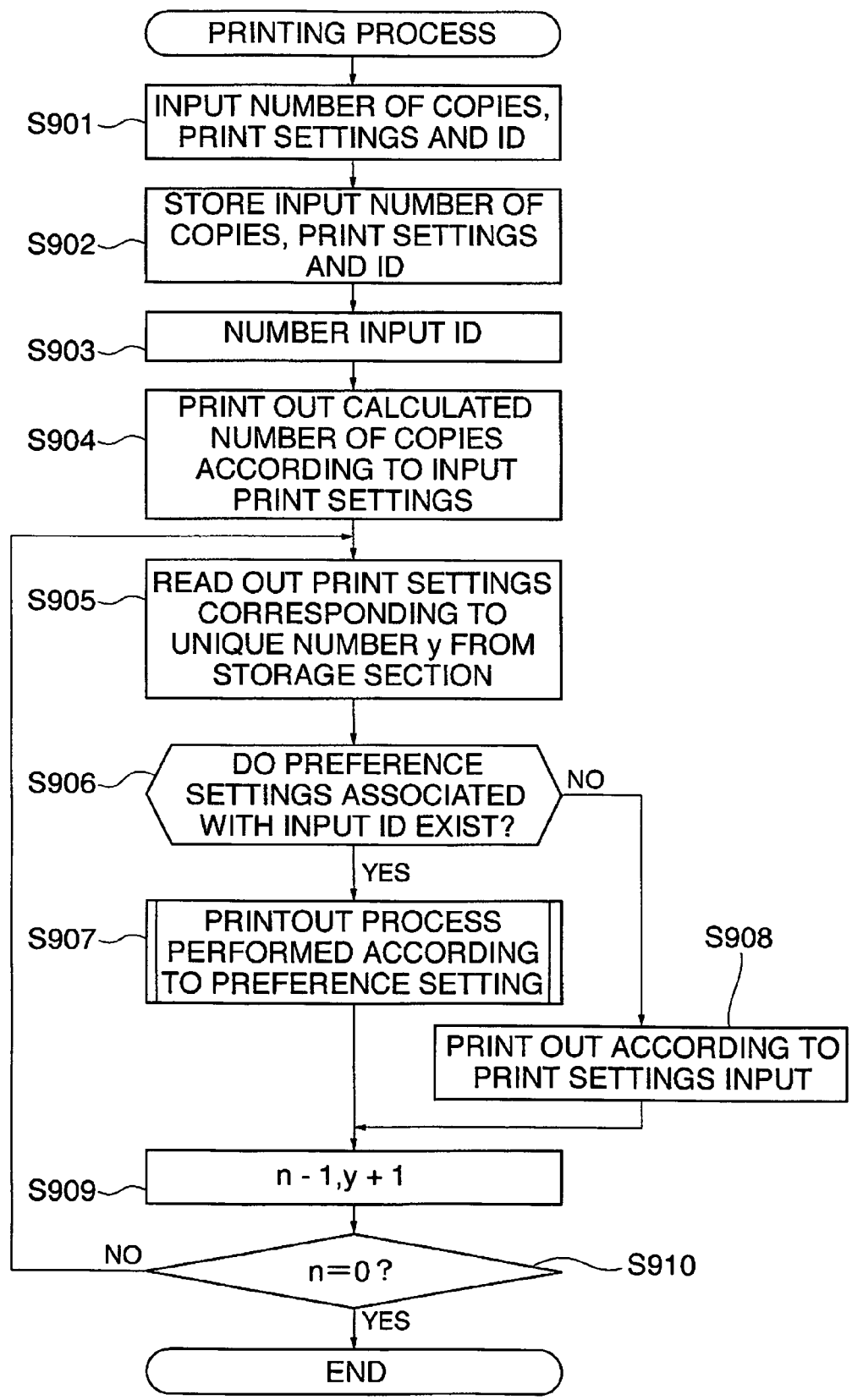
FIG. 9 is a flowchart showing a printing process executed by the MFP.

FIG. 9 is a flowchart showing the printing process performed by the MFP 220 and similar to the flowchart shown in FIG. 5. This process is executed by the CPU 1201 of the controller unit 30.

As shown in FIG. 9, the conference organizer operates the MFP 220 using the operating section 140. Specifically, the conference organizer edits configuration items displayed on the operating section 140 to thereby input the total number of copies of the conference material to be printed, the desired print settings ("N in 1", one-sided/double-sided printing, etc.), and all or desired user IDs of persons to whom the copies of the conference material are to be distributed (step S901).

The conference organizer may access the MFP 220 using the Web browsers of the personal computer 212 or the like, and edit configuration items displayed on the Web browsers, to thereby input the above-mentioned total number of copies of the conference material, the user IDs, and so forth.

In the present embodiment, it is assumed, by way of example, that there are inputs the total number of copies: 10; desired print settings: "4 in 1" and double-sided; and desired user IDs: A123, A456, and A789. When user ID input is executed in the step S901, there may be input user IDs of all the persons to whom the conference material is to be distributed or only desired ones of the above user IDs. Further, at this time, when no print settings are input, the printing is set based on default print settings (100% magnification, one-sided, etc.) for the MFP 220.

The information input in the step S901 is temporarily stored in the RAM 1202 of the controller unit 30 (step S902).

Then, when a start button (not shown) on the operating section 140 or the remote UI is pressed, the CPU 1201 performs numbering to assign unique numbers y to all the user IDs temporarily stored in the RAM 1202. Then, the CPU 1201 calculates the total number n of the user IDs input by the conference organizer, and temporarily stores data obtained by the calculation in the RAM 1202 (step S903). In the present embodiment, the total number n of the user IDs is equal to 3; and the unique number y for the user ID of A123 is equal to 1, the unique number y for the user ID of A456 is equal to 2, and the unique number y for the user ID of A789 is equal to 3.

Then, the CPU 1201 reads out the total number of copies of the conference material to be printed and the total number n of the user IDs, the information of which is temporarily stored in the RAM 1202, and calculates the number of copies of the conference material to be printed according to the print settings ("4 in 1" and double-sided) input in the step S901 by subtracting the total number n of the user IDs from the total number of copies to be printed. Based on the print settings input in the step S901, the CPU 1201 executes an image forming process to print out the conference material (step S904). Since the total number of copies is 10, and the total number n of IDs is 3, the number of copies of the conference material to be printed in the step S504 is equal to 10−3=7. Thus, as shown in FIG. 11, original images (part of which or one-page original image is denoted by reference numeral 1101) are converted into a printout result 1102, whereby 7 copies of the printout result 1102 are printed out.

Figure 11:
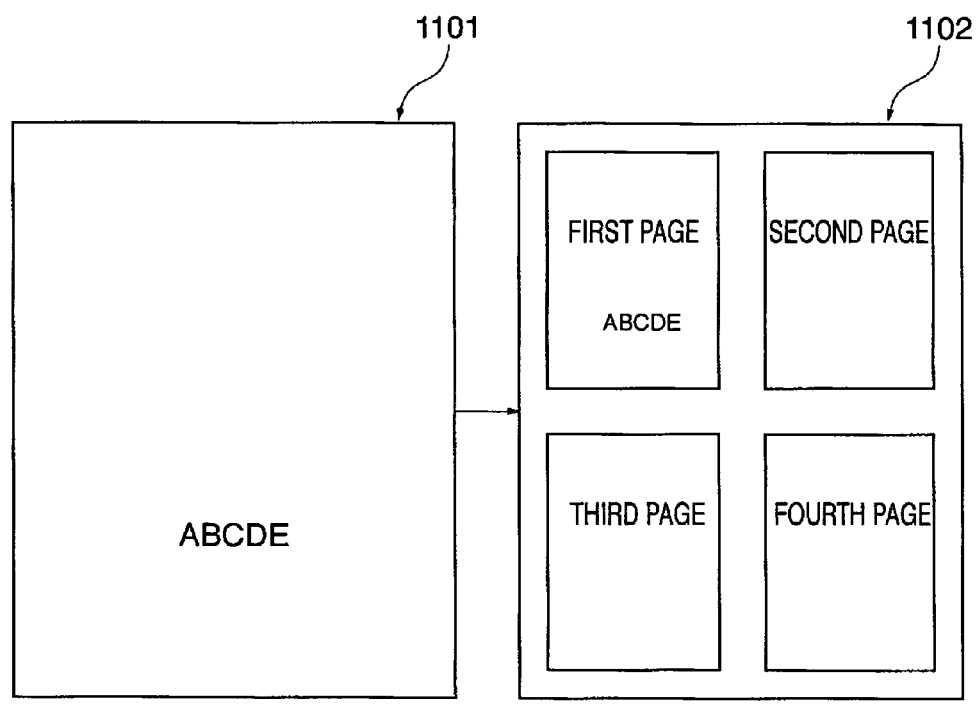
FIG. 11 is a diagram showing an example of a result of printout executed in a step S904 in FIG. 9.

In the illustrated example in FIG. 11, the original images 1101 with the 12-point characters of "ABCDE" are converted into the printout result 1102 based on the print settings of "4 in 1" and double-sided printing, with the size of the character reduced to a point size of 6.

Then, user information corresponding to the ID(y) which in turn corresponds to the unique number y (here, y=1 and ID(y)=ID(1)=A123) is read out from the user information registered through the pre-registration process in FIG. 8 (step S905). The CPU 1201 determines whether or not the user information read out includes preference settings (step S906). If the answer to this question is negative (NO), i.e. if the user information does not include preference settings, an image forming process is executed according to the print settings ("4 in 1" and double-sided) input in the step S901, or default print settings (100% magnification and one-sided), whereby one copy of the printout result 1102 in FIG. 11 is obtained (step S908).

Figure 10:
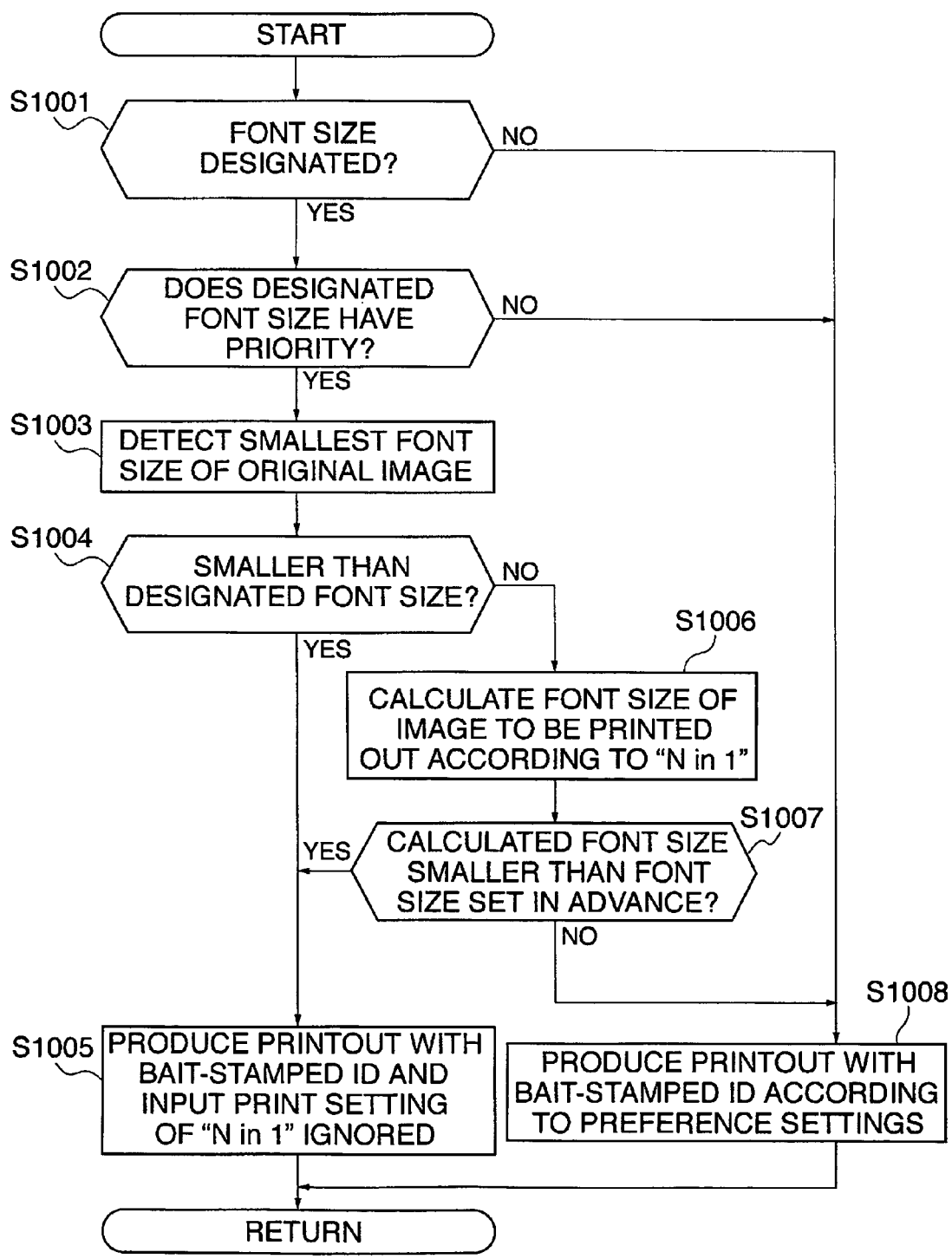
FIG. 10 is a flowchart showing details of a printout process executed in a step S907 in FIG. 9 based on preference settings.

On the other hand, if the answer to the question of the step S906 is affirmative (YES), a printout process is carried out based on the preference settings shown in FIG. 10 (step S907).

Then, 1 is subtracted from the total number n of the user IDs, and 1 is added to the unique number y assigned to the numbered ID(y) (step S909), whereafter it is determined whether or not n=0 holds (step S910). If the answer to this question is negative (NO) i.e. if n>0 holds, the process returns to the step S905 so as to read out another numbered user ID(y) (ID(2) in this case), whereas if the answer to the question is affirmative (YES), i.e. if n=0 holds, the present process is terminated.

The execution of the above process makes it possible to obtain a printout tailored to each user as a presentee of the conference material or presentee of the conference.

FIG. 10 is a flowchart showing the printout process executed in the step S907 in FIG. 9.

Figure 12:
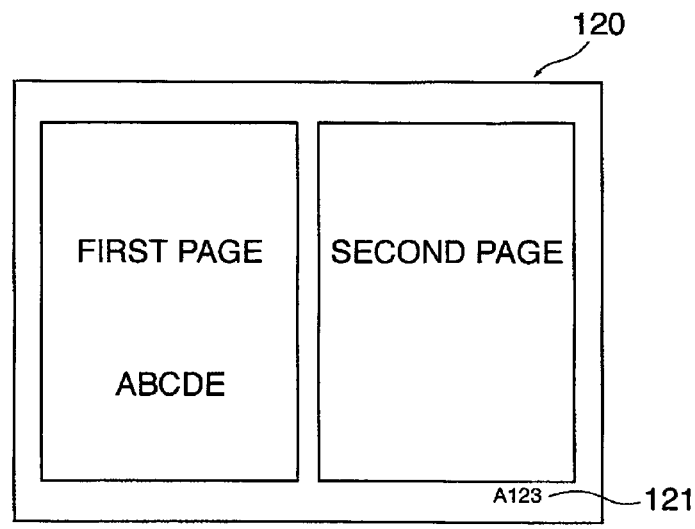
FIG. 12 is a diagram showing an example of a result of printout executed in a step S908 in FIG. 9 and a step S1008 in FIG. 10.

As shown in FIG. 10, it is determined whether or not a font size designated for printout is included in the preferences settings (step S1001). If the answer to this question is affirmative (YES), i.e. if the designated font size is included, the process proceeds to a step S1002, whereas if the answer to the question is negative (NO), i.e. if no designated font size is included, an image forming process is executed based on the preference settings in the user information read out from the storage section in the step S905 in FIG. 9, the user ID is stamped to show that the printout is based on the preference settings of the user (here, the user specified by the user ID of A123), and one copy of the image is printed out, thereby obtaining a printout result 120 as shown in FIG. 12 (step S1008).

The printout result 120 is obtained when the user as a presentee of the conference material or presentee of the conference has designated a font size of not smaller than 8 point in the preference settings, and the image processing is executed such that the characters are printed in a manner conforming to the settings of the designated font size. The ID number 121 as the user ID is bate-stamped on the printout result 120.

In the step S1002, it is determined based on the user information whether or not the designated font size has priority over the other related settings. If the answer to this question is negative (NO), i.e. if the designated font size does not have priority (No to the step S1002), the process proceeds to a step S1008. On the other hand, if the answer to the question is affirmative (YES), i.e. if the designated font size has priority, the smallest font size of the original image is detected based on the result of the OCR processing executed by the scanner image-processing section 1280 when the original is scanned, or is detected when PDL data is processed by the raster image processor 1260 (step S1003). Then, it is determined whether or not the detected font size is smaller than the designated font size (8 point, in the example) in the user information (step S1004).

Figure 13:
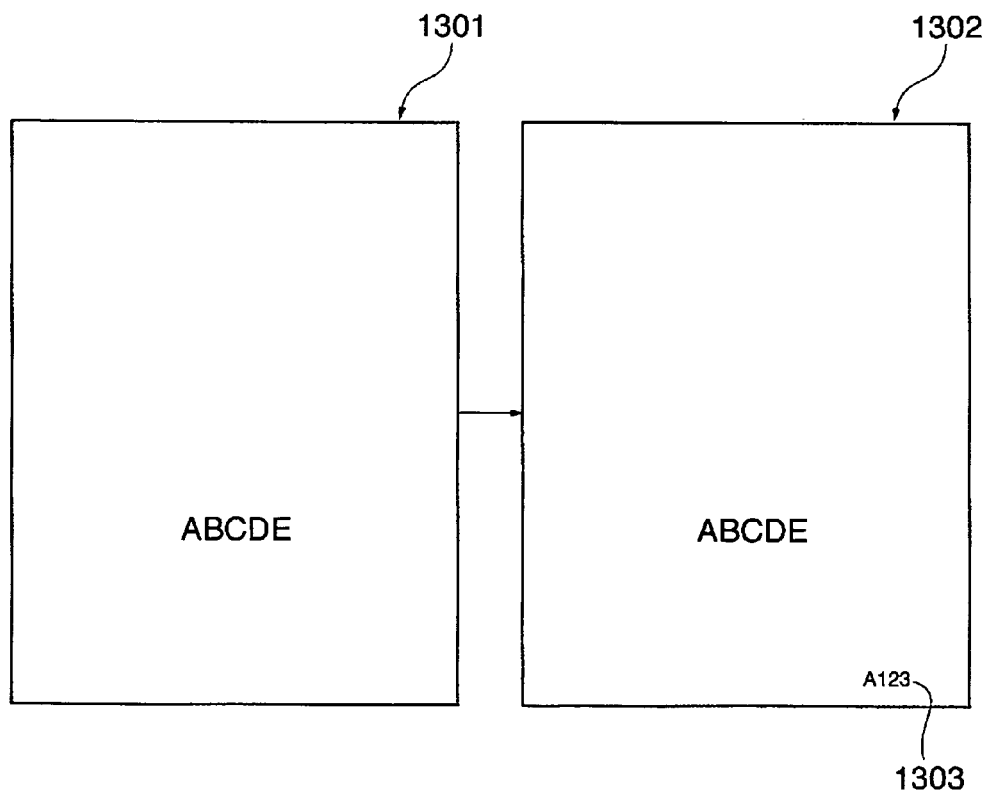
FIG. 13 is a diagram showing an example of a result of printout executed in a step S1005 in FIG. 10.

If the answer to the question of the step S1004 is negative (NO), i.e. if the detected font size is not smaller than the designated font size, the process proceeds to a step S1006, whereas if the answer to the question is affirmative (YES), i.e. if the detected font size is smaller than the designated font size, the setting of "N in 1" ("4 in 1", in the illustrated example) involving reduction, which is included in the print settings input by the user, and the setting of "N in 1" ("2 in 1", in the illustrated example) designated in the preference settings are ignored. Then, an image forming process is carried out based on print settings in which only the setting of "double-sided printing" or "one-sided printing" is held valid, and the user ID is stamped to show that the printout is for the user (who is specified by the user ID of A123, in the illustrated example), and a copy of the resulting image is printed out (step S1005). Thus, as shown in FIG. 13, an original image 1301 is converted to a printout result 1302. In the printout result 1302, an ID number 1303 is bate-stamped on a lower right portion of the sheet.

In a step S1006, a font size is calculated that is to be used, instead of the font size detected in the step S1003, for printout to be performed based on the print setting ("N in 1") designated in the preference settings. That is, the detected font size is scaled based on the preference settings. Then, it is determined whether or not the calculated font size is smaller than the designated font size set in advance (8 point) (step S1007). If the answer to this question is negative (NO), i.e. if the calculated font size is not smaller than the designated font size set in advance even when the printout is assumed to be performed according to the print settings specified by the preference settings (NO to step S1007), the process proceeds to a step S1008. On the other hand, if the calculated font size is smaller than the designated font size set in advance when the printout is assumed to be performed according to the print setting specified by the preference settings (YES to step S1007), the process advances to the step S1005 and then returns to the start of the process.

In the step S1006 in FIG. 10, "N in 1" is shown, by way of example, as a print setting which entails a change in the font size of a text portion of the image. Such a print setting may include a setting which entails a change in image size, thus causing a change in the font size of a text portion of the image, when automatic zooming is performed in response to selection of one of the sheet feed units of the MFP 220, or a setting which entails a change in zoom ratio for printing.

According to the second embodiment described above, a user ID, preference settings ("N in 1", one-sided/double-sided printing, etc.) associated with the user ID, a font size, and priority are registered in advance in the storage section via the operating section 140 of the MFP 220 or the personal computer 212, or the like. The preference settings, the font size, and the priority are read out from the storage section according to the user ID input together with the number of copies of a conference material and print settings e.g. via the operating section 140. Then, it is determined based on the information read out from the storage section whether printout is to be performed according to the preference settings or only one of the one-sided printing and the double-sided printing is to be performed. As a result, for example, when reduction printing is set e.g. by a conference organizer, it is possible to prevent conference materials from being printed out in a state so reduced as will make it difficult for presentees of the conference to read. This makes it possible to print out conference materials such that they are easily readable even if they have difficulty in reading small characters.

According to the aforementioned first and second embodiments, materials to be distributed in conferences or the like can be printed out not for conveniences of a conference organizer, but to meet demands of presentees of the conference or persons to whom the conference materials are to be distributed. This makes it possible to print out materials such that they are easily readable even by persons who have difficulty in reading small characters due to presbyopia or the like. Moreover, it is possible to supply materials which will meet the preferences of presentees, and hence it is possible to print appropriate conference materials without performing wasteful printing.

Further, both the aforementioned first and second embodiments save a conference organizer or like person from having to input IDs of presentees (users), when they are made in cooperation with a conference schedule-adjusting wizard in the environment of a network, such as an in-company LAN. This makes it possible to further enhance user interface.

Further, it is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

Although in the above-described embodiments, the printing method of a multifunction apparatus is an electrophotographic method, by way of example, this is not limitative, but the present invention can be applied to various types of printing methods, such as an ink jet method, a thermal transfer method, a thermal system, an electrostatic method, an electrosensitive recording method.

The above-described program may be formed by a program code executed by an object code and an interpreter, script data supplied to an OS (operating system), and the like.

This application claims the benefit of Japanese Application No. 2005-122759 filed Apr. 20, 2005, which is hereby incorporated by reference herein in its entirety.

What is claimed is:

1. An image forming apparatus that prints an image based on a print setting, the image forming apparatus comprising:
   a registering unit configured to register print settings for users;
   a designating unit configured to designate at least one user among the users;
   a setting unit configured to set a number of copies;
   a printing unit configured to execute a first image printing process based on the print setting corresponding to the at least one user designated by said designating unit from among the print settings registered by said registering unit, and to execute a second image printing process based on another print setting that is different from the registered print settings for the users and is not registered for the users by said registering unit, the second image printing process being executed for printing a number of copies calculated by subtracting a number of copies printed by the first image printing process from the number of copies set by said setting unit.

2. An image forming apparatus as claimed in claim 1, further comprising an addition unit configured to add user-identifying information for identifying the designated user to the image to be printed by the first image printing process, and to not add the user-identifying information to the image to be printed by the second image printing process.

3. An image forming apparatus as claimed in claim 2, wherein said registering unit registers a user ID for identifying the designated user and associates the print setting of the designated user with the user ID.

4. An image forming apparatus as claimed in claim 1, wherein said registering unit registers a user ID for identifying the designated user and associates the print setting of the designated user with the user ID.

5. An image forming apparatus as claimed in claim 3, wherein said addition unit adds a character string indicative of the user ID to the image to be printed by the first image printing process, as the user-identifying information.

6. A control method of controlling an image forming apparatus that prints an image based on a print setting, the method comprising the steps of:
   registering print settings in the image forming apparatus for users;
   designating at least one user among the users;
   setting a number of copies;
   executing a first image printing process based on the print setting corresponding to the at least one designated user from among the print settings registered in the registering step;
   executing a second image printing process based on another print setting that is different from the registered print settings for the users and is not registered for the users in the registering step, the second image printing process being executed for printing a number of copies calculated by subtracting a number of copies printed by the first image printing process from the number of copies set in the setting step,
   wherein the image forming apparatus executes at least the registering step and the first and second image printing process executing steps.

7. A non-transitory computer-readable storage medium storing a control program for causing a computer to execute a control method of controlling an image forming apparatus for printing an image based on a print setting, the control program comprising:
   a registering code configured to register print settings for users;
   a designating code configured to designate at least one user among the users;
   a setting code configured to set a number of copies;
   a printing code configured to execute a first image printing process based on the print setting corresponding to the at least one designated user from among the print settings registered by the registering code, and to execute a second image printing process based on another print setting that is different from the registered print settings for the users and is not registered for the users by the registering code, the second image printing process being executed for printing a number of copies calculated by subtracting a number of copies printed by the first image printing process from the number of copies set by said setting code.

8. An image forming apparatus as claimed in claim 1, wherein the first image printing process is executed to print an image with user-identifying information for identifying the designated user, and the second image printing process is executed to print an image without any user-identifying information for identifying a user.

9. An image forming apparatus as claimed in claim 1, wherein the designating unit further designates the another print setting that is different from the registered print settings for the users.

* * * * *